(12) United States Patent
Kulkarni et al.

(10) Patent No.: US 8,033,722 B2
(45) Date of Patent: Oct. 11, 2011

(54) THERMOCOUPLE FOR GAS TURBINE ENVIRONMENTS

(75) Inventors: Anand A. Kulkarni, Oviedo, FL (US); David J. Mitchell, Oviedo, FL (US); Edward R. Roesch, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 499 days.

(21) Appl. No.: 12/327,058

(22) Filed: Dec. 3, 2008

(65) Prior Publication Data

US 2010/0027584 A1 Feb. 4, 2010

Related U.S. Application Data

(60) Provisional application No. 61/085,645, filed on Aug. 1, 2008, provisional application No. 61/085,654, filed on Aug. 1, 2008.

(51) Int. Cl.
*G01K 7/02* (2006.01)
(52) U.S. Cl. .......... 374/179; 374/E7.004; 374/144
(58) Field of Classification Search .......... 374/179, 374/137, 144, 148, 208
See application file for complete search history.

(56) References Cited

U.S. PATENT DOCUMENTS

| | | | | |
|---|---|---|---|---|
| 2,888,508 A * | 5/1959 | Rademacher | | 374/179 |
| 3,007,990 A * | 11/1961 | Ihnat | | 374/E7.009 |
| 4,480,930 A | 11/1984 | DeZubay et al. | | |
| 4,595,298 A * | 6/1986 | Frederick | | 374/144 |
| 4,969,956 A | 11/1990 | Kreider et al. | | |
| 6,673,271 B2 * | 1/2004 | Hodgkinson et al. | | 374/162 |
| 6,857,776 B2 | 2/2005 | Park | | |
| 6,991,370 B2 | 1/2006 | Kofune et al. | | |
| 7,004,622 B2 * | 2/2006 | Hardwicke et al. | | 374/141 |
| 7,695,190 B2 * | 4/2010 | Davda | | 374/179 |
| 2004/0162374 A1 * | 8/2004 | Watson et al. | | 524/409 |
| 2005/0198967 A1 | 9/2005 | Subramanian | | |
| 2006/0227849 A1 * | 10/2006 | Phillips | | 374/179 |
| 2010/0027584 A1 * | 2/2010 | Kulkarni et al. | | 374/179 |

(Continued)

FOREIGN PATENT DOCUMENTS

GB 2439389 A 12/2007

(Continued)

OTHER PUBLICATIONS

S. Prakash, R.C. Budhani and R.F. Bunshah; "Development of Thin Film Temperature Sensors for High Performance Turbo-Jet Engines"; Feb. 1, 1988; Materials Research Bulletin, vol. 23, pp. 187-195; Pergamon Journals, USA.

(Continued)

*Primary Examiner* — Yaritza Guadalupe

(57) ABSTRACT

A thin-film thermocouple (12) is disclosed for use with a gas turbine component. The thermocouple may be formed on a non-planar substrate (22) having formed thereon an electrically insulating layer (34) capable of maintaining its insulating properties at gas turbine operating temperatures. A first thermocouple leg (26) made of pure platinum is then deposited on the dielectric layer (34). A second thermocouple leg (28) made of another pure metal or a transparent ceramic oxide is also formed on the dielectric layer (34) wherein the first and second thermocouple legs make ohmic contact at a first end of each leg to form a hot junction (30) for conversion of heat into an electrical signal. The thermocouple may be deposited on a surface of a thermal barrier coating or between a thermal barrier coating and an underlying metal substrate.

20 Claims, 3 Drawing Sheets

U.S. PATENT DOCUMENTS

| | | | |
|---|---|---|---|
| 2010/0039288 A1* | 2/2010 | Mitchell et al. | 374/179 |
| 2010/0039290 A1* | 2/2010 | Mitchell et al. | 340/870.17 |
| 2010/0039779 A1* | 2/2010 | Mitchell et al. | 361/739 |
| 2010/0117859 A1* | 5/2010 | Mitchell et al. | 340/870.16 |
| 2010/0226756 A1* | 9/2010 | Mitchell et al. | 415/118 |
| 2010/0226757 A1* | 9/2010 | Mitchell et al. | 415/118 |

FOREIGN PATENT DOCUMENTS

| | | | |
|---|---|---|---|
| WO | WO 2005/112140 A3 | 11/2005 | |

OTHER PUBLICATIONS

Jih-Fen Lei, Lisa C. Martin and Herbert A. Will; "Advances in Thin Film Sensor Technologies for Engine Applications"; NASA Technical Memorandum; Jun. 2-5, 1997; pp. 1-6.

Kenneth G. Kreider, Frank Dimeo; "Platinum/palladium thin-film thermocouples for temperature measurements on silicon wafers"; Sensors and Actuators A; Oct. 31, 1997; vol. 69, No. 1; pp. 46-52; Elsevier Sequoia S.A., Lausanne, CH.

D.D. Edwards, et al, A New Transparent Conducting Oxide in the $Ga_2O_3$-$In_2O_3$0-$SnO_2$ System, American Institute of Physics, Mar. 31, 1997, p. 1706, App. Phys. Lett. 70 (13).

Roy G. Gordon, Criteria for Choosing Transparent Conductors, MRS Bulletin, Aug. 2000, p. 52, See www.mrs.org/publications/bulletin.

After Cerac Corporation, ITO, Tin-Doped Indium Oxide for Optical Coating, (2002). See www.cerac.corporation.com/pubs/proddata/ito.htm.

J.E. Medvodeva, Unconventional approaches to combine optical transparency with electrical conductivity, Apr. 11, 2007, Department of Physics, University of Missouri, Rolla, Rolla, MO, 65409.

Tadatsugu Minami, Present status of transparent conducting oxide thin-film development for Indium-Tin-Oxide (ITO) substitutes, Science Direct, 2007, See www.sciencedirect.com.

Andrea Ambrosini, et al, Electrical, Optical and Structural Properties of Tin-Doped $In_2O_3$-$M_2O_3$ Solid Solutions (M=Y, Sc), Jun. 27, 2000, Journal of Solid State Chemistry, Issue 53, pp. 41-47.

A. Amaral, et al, Influence of the Initial Layers on the Optical and Electrical Properties of ITO Films, 2001. Optical Materials, 17, pp. 291-294.

Kenneth R. Poeppelmeir, Enabling Photovoltaic Materials: Rational Syntheses and Properties of Transparent Conductors, $10^{th}$ International Workshop on "Functional Oxides" Caen Jul. 3-4, 2006.

Moshe Yust, Kenneth G. Kreider; "Transparent Thin Film Thermocouple"; Electronics and Optics; Thin Solid Films, Sep. 1, 1989; pp. 73-78; vol. 176, No. 1; XP025831215; ISSN: 0040-6090.

* cited by examiner

THERMOCOUPLE FOR GAS TURBINE ENVIRONMENTS

This application claims benefit of the 1 Aug. 2008 filing dates of U.S. Provisional Application 61/085,645 and U.S. Provisional Application 61/085,654.

FIELD OF THE INVENTION

The present invention generally relates to thermocouples and their method of manufacture, and in particular to thin-film monoelemental thermoelectric elements and structure forming thermocouples that may be deposited on non-planar surfaces and are efficient at ultra high temperatures.

BACKGROUND OF THE INVENTION

There is an increasing demand for real-time measurement of the structural integrity of critical moving components in modern gas turbines, which operate at ultra high temperatures. Moreover, requirements for gas turbines in the future call for ever higher operating temperatures. However, the harsh turbine environment encountered in these turbines along with the lack of long-term demonstrated sensor functionality, make it difficult to meet these objectives. The materials exposed to the hot gas path are being operated more closely to their design margins, which require the development of accurate and reliable sensors for monitoring the materials' condition during operation. While life prediction tools utilize laboratory generated data, active monitoring with embedded sensors enable a better understanding of the physics of material failure, loss of functionality due to material degradation, and coating delamination or cracking or spalling. The turbine typically includes a wide range of component materials with varied exposure to high temperatures and high centrifugal forces on rotating elements, and it is often surrounded by highly conductive metallic materials.

A temperature sensor with demonstrated reliability is a thermocouple. In principle, when two conductors made of dissimilar metals are joined at both ends, a thermoelectric circuit is formed. When one of the ends of this circuit is heated, there is a continuous current that flows in the thermoelectric circuit. Thomas Seebeck made this discovery in 1821. If this circuit is broken at the center, the hot open circuit voltage (the Seebeck voltage) is a function of the junction temperature and the composition of the two metals. Such a circuit is known as a thermocouple.

Most prior art thermocouples are made of wire. For example, a standard thermocouple, such as a Type S thermocouple, is made of a pure platinum wire for one wire leg and an alloy of approximately 90% platinum and 10% rhodium for the second wire leg. Another example of a standard prior art thermocouple is a Type R thermocouple, which has one wire leg made of an alloy consisting of 95% platinum and 5% rhodium, while the second wire leg is made of an alloy consisting of 87% platinum and 13% rhodium. These alloy combinations work well when the thermocouples are made of wire wherein the percent of the constituents along the length of the wire are consistent. This is not necessarily the case when the thermocouple legs are deposited in thin-film structures. For example, when an alloy (e.g., platinum-10% rhodium) is deposited, compositional variations along the length of the thermocouple leg will occur. That is to say, the 10% rhodium will not be evenly distributed everywhere, which will cause a deviation in the performance of the thermocouple.

Accordingly, there is a need for a thermocouple that is reliable and that can withstand the harsh environment of a gas turbine. While the thermocouple needs to function in a turbine hot gas path section where temperatures may be greater than 1300° C., it is also desired that the thermocouple has minimal impact on the performance or life of the component.

BRIEF DESCRIPTION OF THE DRAWINGS

The invention is explained in the following description in view of the drawings that show:

FIG. 4A is a cross-sectional view of a portion of the turbine blade showing a thermocouple in accordance with an embodiment of the present invention formed over a high temperature dielectric on the thermal barrier coating (TBC) on the blade.

FIG. 4B is a cross-sectional view of a portion of the turbine blade showing a thermocouple in accordance with an embodiment of the present invention formed over a high temperature dielectric deposited directly onto the blade's substrate and beneath the TBC layer.

DETAILED DESCRIPTION OF THE INVENTION

With the development of thin-film techniques it is recognized that there are several advantages of thin-film thermocouples over the standard wire thermocouples for measuring solid surface temperatures. Their low mass provides a very rapid response, the thinness of the film does not disturb the convective heat transfer characteristics of the surface compared to a wire sensor, and the small size is quite compatible with complex electronic fabrication techniques. Moreover, the low mass of the thin-film sensor, when attached to a turbine component, does not create problems with centrifugal forces placed on the thermocouple by turbine rotation. Furthermore, the thin-film sensor allows conformance to the non-planar surfaces of turbine components. Additionally, thin-film sensor implementation on critical moving components in the harsh turbine environment provides an excellent source of data for condition-based monitoring during operation. These thermocouples provide a real-time temperature profile that enables reliability monitoring of the part in service. One such family of thin-film sensors is the monoelemental thermocouple. A mono-elemental thermocouple has two legs each made of a different single-element material (e.g., precious metals like platinum, palladium, rhodium, or iridium). In other words, a monoelemental thermocouple does not use legs of alloyed wire as in the Type S and Type R wire thermocouples.

Pure platinum and pure palladium metals for the two legs of the thermocouple may be used due to the minimal mismatch of their CTE with that of an underlying ceramic thermal barrier coating (TBC) deposited on the turbine component (i.e., blade). Also, due to the purity of these metals (i.e., they are monoelemental), there is very little chemical variation along the length of the deposited thermocouple lines to contribute to a variation in the performance of the thermocouple. The term "pure" or "monoelemental" as used herein means a purity level of at least 99 wt. percent. Additional advantages of using these metals include their excellent oxidation properties and high melting point (e.g., platinum is 1769° C.), which allows the thermocouple to be deposited on the top surface of the TBC where it may be exposed directly to the hot combustion gas path environment.

Figure 1:
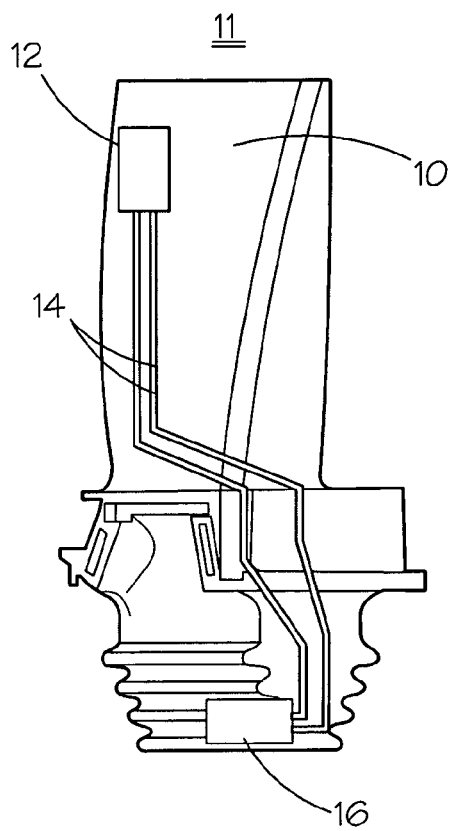
FIG. 1 is a perspective view of a turbine blade having a sensor, such as a thermocouple, formed thereon.

One instrumented moving turbine component that would enable collection of real-time temperature data is shown in FIG. 1, wherein a turbine blade 10 of a gas turbine 11 has mounted thereon a thermocouple 12 and conductors 14 leading to circuitry 16, which processes and transmits data derived from the thermocouple 12 to a receiver circuit (not shown) external the turbine 11. An effective solution to the circuitry 16 is disclosed in published U.S. Patent Application Publication No US 2005/0198967 A1 entitled SMART COMPONENT FOR USE IN AN OPERATING ENVIRONMENT.

Figure 2:
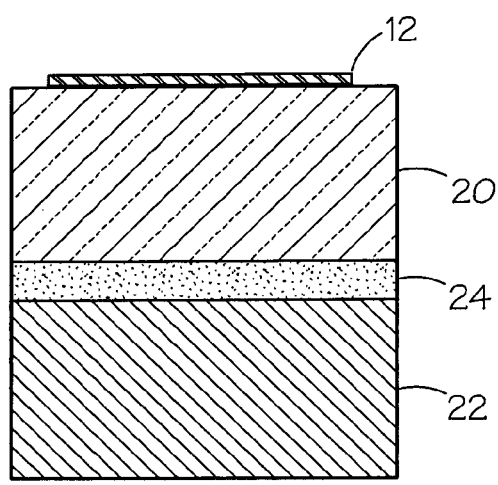
FIG. 2 is cross-sectional view of a portion of the turbine blade showing a thin-film thermocouple in accordance with the present invention formed on the thermal barrier coating on the blade.
Figure 3:
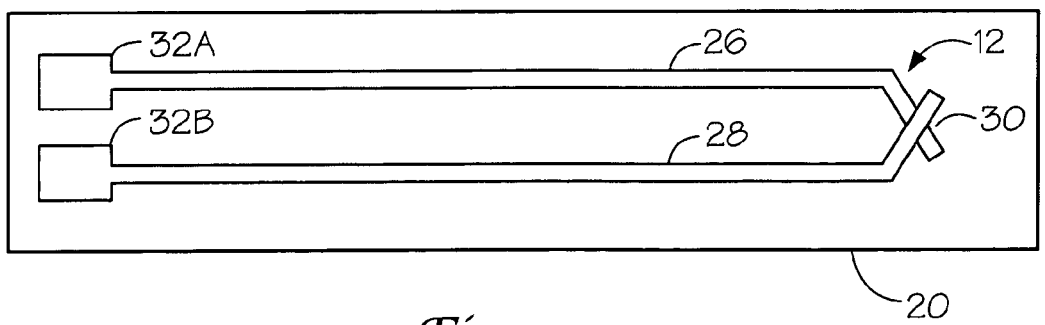
FIG. 3 is a planar view of the thin-film thermocouple in accordance with the present invention.

Referring now to FIG. 2, a cross-sectional view of a portion of the turbine blade 10 is shown having mounted thereon a thin-film thermocouple 12 in accordance with one embodiment of the present invention, which is formed atop the TBC 20 covering the metal blade. The underlying substrate 22 of the blade 10 has first formed thereon a bond coat 24, which separates the TBC 20 from the substrate and ensures a good bond between the two. FIG. 3 is a plan view of the thermocouple 12, where in accordance with one embodiment, a first leg 26 is formed of pure platinum and a second leg 28 is formed of pure palladium. First ends of the two legs 26 and 28 are joined together at a point 30, which makes ohmic contact between these two legs and forms a hot junction for conversion of heat into an electrical signal (i.e., the Seebeck voltage). Bonding pads 32A and 32B are formed on the other ends of the legs 26 and 28, respectively, which allow for the making of electrical contact with the conductors 14 in order to transmit the electrical signal (i.e., Seebeck voltage) to the circuitry 16.

Figure 4C:
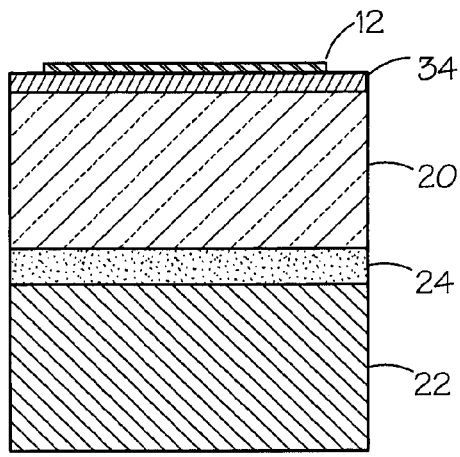
FIG. 4C is a cross-sectional view of a portion of the turbine blade showing a thermocouple in accordance with an embodiment of the present invention formed within the TBC layer.
Figure 4C:
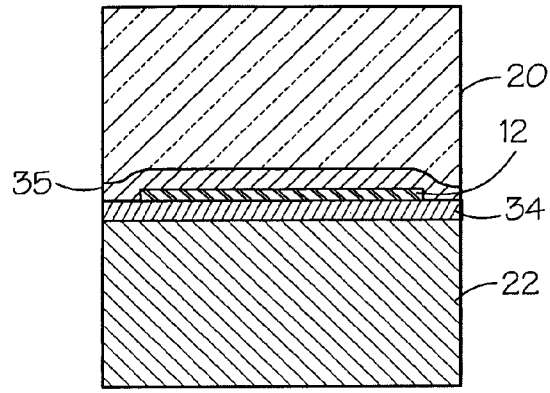
Figure 4C:
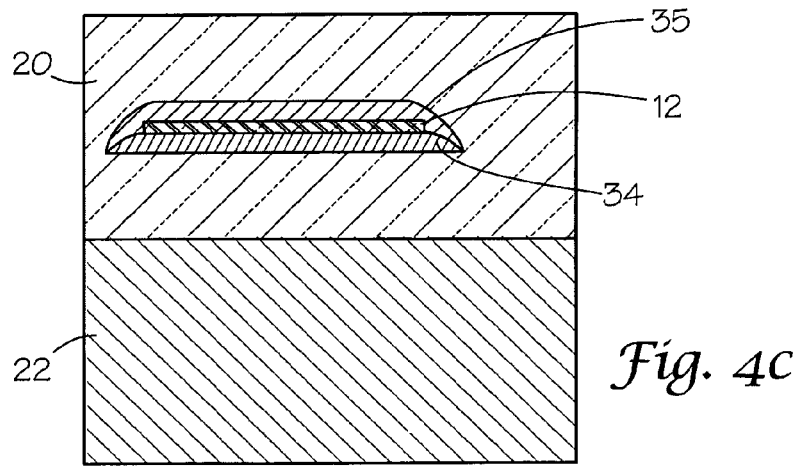

Another consideration in a high-temperature turbine environment (e.g., greater than 800° C.) is the dielectric/ionic conductivity of the TBC material. The standard TBC, which is made from yttria stabilized zirconia, loses its dielectric strength above 800° C. Accordingly, there may be a need for a ceramic insulator coating 34 (FIG. 4A) to separate the thermocouple 12 from the TBC 20, which insulator coating typically has a dielectric strength (high temperature resistance of greater than 0.5 mega ohms) above 1100° C. Various oxides are capable of retaining such strength at high temperatures. One composition of interest is yttrium aluminum garnet ("YAG"), which has been deposited in thickness within a range of 50-250 microns and has demonstrated excellent performance of the thermocouple at high temperature (e.g., above 1100° C.). A cross-sectional view of the dielectric insulator coating 34 on the TBC 20 is shown in FIG. 4A. In particular, the dielectric insulator coating 34 physically and electrically separates the thermocouple 12 from the TBC 20. An alternate embodiment of the invention is shown in FIG. 4B which illustrates another portion of the turbine blade wherein the dielectric insulator coating 34 is deposited directly onto the substrate 22 and the thermocouple 12 is deposited over this dielectric insulator coating. Also, another dielectric insulator coating 35 (such as of the same material and thickness) may be deposited over the thermocouple 12 if needed. Finally, the TBC layer 20 is deposited over the dielectric insulator coating 35 (or directly over the thermocouple). Accordingly, the thermocouple 12 is embedded in the structure and senses directly the temperature of the component substrate 22. FIG. 4C is an embodiment which illustrates yet another portion of the turbine blade wherein the thermocouple 12 is embedded within the TBC layer 20 and is electrically insulated from contact with the TBC material 20 by layers of electrically insulating material 34, 35 in order to provide a measurement of the temperature within the TBC layer 20. Such structures may be formed by thermally spraying the respective materials as the TBC layer 20 is formed in a conventional manner.

Figure 5:
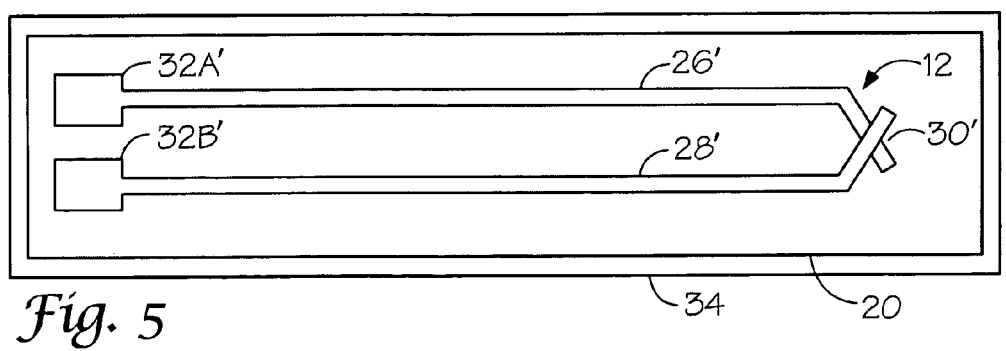
FIG. 5 is a planar view of the thin-film thermocouple deposited over the high temperature dielectric over or beneath the TBC layer in accordance with the present invention.

FIG. 5 is a plan view of the thermocouple 12 of FIG. 4A, wherein in accordance with an embodiment a first leg 26' is formed of pure platinum and a second leg 28' is formed of pure palladium. The two legs 26' and 28' are joined together at a point 30', which makes ohmic contact between the two legs. Bonding pads 32A' and 32B' are formed on the other end of the legs 26' and 28', respectively, which allows for making electrical contact with the conductors 14.

Figure 6:
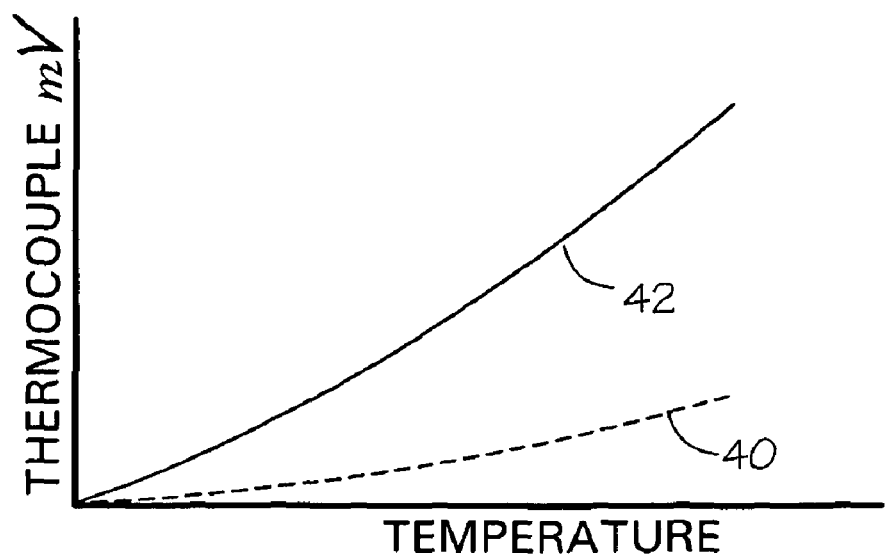
FIG. 6 is a graph showing the performance of the mono-elemental thermocouple as temperature increases.
Figure 7:
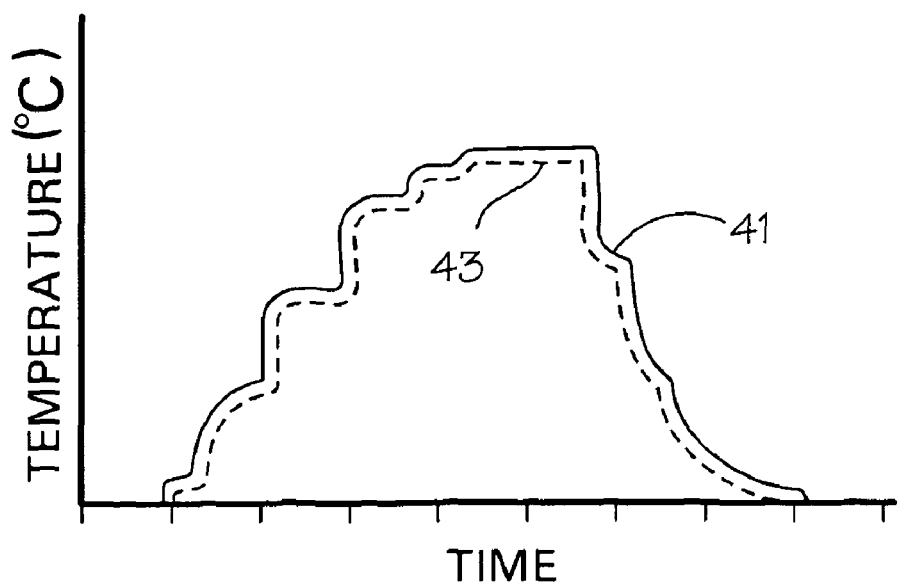
FIG. 7 is a graph showing the performance of the mono-elemental thermocouple compared with a standard Type S type thermocouple.

FIG. 6 is a graph showing the performance (curve 40) of the monoelemental thermocouple. As temperature increases, the thermocouple voltage (Seebeck voltage in mv) increases substantially linearly. The performance of these thermocouples is shown in FIG. 7 by curve 41, with comparison to standard Type S thermocouples (curve 43). In this configuration, the monoelemental thermocouple performance is within 3 degrees of the Type S thermocouple, which exhibits an excellent correlation.

The legs 32A and 32B (or 32A' and 32B') and the conductors 14 may be deposited on the blade 10 by plasma spraying, EB PVD, CVD, pulsed laser deposition, mini-plasma, direct write, mini hvof or solution plasma spraying, for example. In one embodiment the legs of the thermocouple 12 are deposited at a thickness within the range of 50-100 microns, which thickness may be necessary for endurance in the harsh environment of a gas turbine.

It is noted that the scale of the cross-sectional illustrations of FIGS. 2, 4A 4B and 4C are such that they may be considered to show either a planar substrate or curved or non-planar surface as found on most turbine components.

In accordance with an alternate embodiment of the invention the second leg 28 or 28' may be replaced with a transparent conducting oxide (TCO), while the first leg 26 or 26' remains pure platinum. Such TCO provides a good thermoelectric response with platinum as the first leg, mainly due to their excellent electrical conductivity. Another advantage is their chemical stability. Examples of such oxides are $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO. This alternate embodiment would be optimum for environments where the temperature exceeds 1550° C. because pure palladium begins to soften and oxidize above this temperature. The performance curve for a pure platinum-oxide thermocouple is depicted by curve 42 in FIG. 6.

A method of manufacturing a thin film thermocouple on a non-planar surface of a turbine component may include the steps of: laser cutting a first mask and shaping the first mask to conform with a non-planar surface, the first mask including a pattern opening defining a first element of the thermocouple; depositing a first conductor in the pattern opening of the first mask; laser cutting a second mask and shaping the second mask to conform with the non-planar surface, the second mask including a pattern opening defining a second element of the thermocouple; and depositing a second conductor in the pattern opening of the second mask.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A thermocouple for use in a high temperature environment for a gas turbine engine comprising:
   a first electrically insulating layer formed over a surface of a component of said gas turbine engine and effective to provide a degree of electrical insulation at an operating temperature of the engine effective to permit operation of a thermocouple;
   a first thermocouple leg comprising platinum having a thickness in the range of 50-100 microns deposited on said first insulating layer; and,
   a second thermocouple leg comprising palladium also formed on said first insulating layer and having a thickness in the range of 50-100 microns, wherein said first and second thermocouple legs make ohmic contact at a first end of each leg to form a hot junction for conversion of heat into an electrical signal, and wherein a second end of each leg is disposed for making electrical contact with a circuit for processing said electrical signal into a reading of the temperature of said surface of said component.

2. A thermocouple as in claim 1 wherein said platinum purity is at least 99 wt. percent.

3. A thermocouple as in claim 1 wherein said palladium purity is at least 99 wt. percent.

4. A thermocouple as in claim 1 further comprising a ceramic thermal barrier coating deposited between said substrate and said first insulating layer.

5. A thermocouple as in claim 1 further comprising:
   a second electrically insulating layer deposited over said thermocouple; and
   a thermal barrier coating deposited over said second insulating layer.

6. A thermocouple as in claim 5 wherein said second insulating layer is an oxide coating that maintains a resistance greater than 0.5 mega ohms above 1100° C.

7. A thermocouple as in claim 6 wherein said second insulating layer comprises yttrium aluminum garnet.

8. A thermocouple as in claim 1 further comprising:
   a lower portion of a ceramic thermal barrier coating layer deposited between said substrate and said first insulating layer;
   a second electrically insulating layer deposited over said thermocouple; and
   an upper portion of the ceramic thermal barrier coating layer deposited over said second insulating layer, such that the thermocouple is disposed with the ceramic thermal barrier coating layer.

9. A thermocouple as in claim 1 wherein said first insulating layer is an oxide coating that maintains a resistance greater than 0.5 mega ohms above 1100° C.

10. A thermocouple as in claim 9 wherein said first insulating layer comprises yttrium aluminum garnet.

11. An instrumented gas turbine component comprising:
    a metal substrate thermally insulated by a thermal barrier coating;
    a layer of electrically insulating material that maintains a resistance greater than 0.5 mega ohms above 1100° C. deposited on an exposed surface of the thermal barrier coating;
    a thermocouple formed on the layer of electrically insulating material, the thermocouple comprising a first leg comprising a first pure metal and a second leg making ohmic contact with the first leg.

12. The component of claim 11, wherein the second leg comprises a second pure metal different than the first pure metal.

13. The component of claim 11, wherein the first leg comprises platinum and the second leg comprises palladium, rhodium or iridium.

14. The component of claim 11, wherein the second leg comprises one of the group of consisting of $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO.

15. An instrumented gas turbine component comprising:
    a metal substrate;
    a first layer of electrically insulating material that maintains a resistance greater than 0.5 mega ohms above 1100° C. deposited above the metal substrate;
    a thermocouple formed on the layer of electrically insulating material, the thermocouple comprising a first leg comprising a first pure metal and a second leg making ohmic contact with the first leg;
    a second layer of electrically insulating material that maintains a resistance greater than 0.5 mega ohms above 1100° C. deposited above the thermocouple; and
    a ceramic thermal barrier coating deposited over the second layer of electrically insulating material.

16. The component of claim 15, wherein the thermal barrier coating material comprises yttria stabilized zirconia and the electrically insulating material comprises yttrium aluminum garnet.

17. The component of claim 16, wherein the second leg comprises a second pure metal different than the first pure metal.

18. The component of claim 17, wherein the second leg comprises one of the group of palladium, rhodium or iridium.

19. The component of claim 15, wherein the second leg comprises one of the group of consisting of $CuAlO_2$, $In_2O_3$—$SnO_2$, $In_2O_3$—$SnO_2$ doped with ZnO, $Ga_2O_3$, $CdIn_2O_4$, $Cd_2SnO_4$, and ZnO.

20. The component of claim 15, wherein each leg of the thermocouple has a thickness in the range of 50-100 microns.

* * * * *